(12) United States Patent
Zaffaroni et al.

(10) Patent No.: US 9,315,698 B2
(45) Date of Patent: Apr. 19, 2016

(54) INDICATOR FOR CURE OF TWO-COMPONENT-EPOXY ADHESIVES

(71) Applicant: HENKEL AG & CO. KGAA, Duesseldorf (DE)

(72) Inventors: Giorgio Zaffaroni, Suno (IT); Antonello Talamini, Castano Primo (IT); Monica Noseda, Albate (IT)

(73) Assignee: HENKEL AG & Co. KGAA, Duesseldorf (DE)

(*) Notice: Subject to any disclaimer, the term of this patent is extended or adjusted under 35 U.S.C. 154(b) by 0 days.

(21) Appl. No.: 14/186,266

(22) Filed: Feb. 21, 2014

(65) Prior Publication Data

US 2014/0171552 A1 Jun. 19, 2014

Related U.S. Application Data

(63) Continuation of application No. PCT/EP2012/066311, filed on Aug. 22, 2012.

(30) Foreign Application Priority Data

Aug. 24, 2011 (EP) .................................... 11425225

(51) Int. Cl.
| | |
|---|---|
| *C09J 163/00* | (2006.01) |
| *C08K 13/00* | (2006.01) |
| *C08K 13/02* | (2006.01) |
| *C08K 3/34* | (2006.01) |
| *C08K 3/36* | (2006.01) |
| *C08G 59/24* | (2006.01) |
| *C08G 59/66* | (2006.01) |
| *C08G 59/40* | (2006.01) |
| *B32B 27/38* | (2006.01) |

(52) U.S. Cl.
CPC .............. *C09J 163/00* (2013.01); *C08G 59/40* (2013.01); *C08G 59/66* (2013.01)

(58) Field of Classification Search
None
See application file for complete search history.

(56) References Cited

U.S. PATENT DOCUMENTS

| | | | | |
|---|---|---|---|---|
| 3,891,583 | A | * 6/1975 | Drisko et al. | ................. 523/443 |
| 4,160,064 | A | 7/1979 | Nodiff | |
| 6,017,983 | A | 1/2000 | Gilleo | |
| 8,642,709 | B2 | * 2/2014 | Walter et al. | ................. 525/505 |
| 2005/0143496 | A1 | * 6/2005 | Mueller | ................. 523/400 |

FOREIGN PATENT DOCUMENTS

| | | | | |
|---|---|---|---|---|
| CA | 2788739 | A1 * | 9/2011 | ............ C08L 63/00 |
| EP | 0 438 725 | | 7/1991 | |
| JP | 2005 325149 | | 11/2005 | |
| WO | WO 2011029733 | A1 * | 3/2011 | ............ C08G 59/50 |
| WO | WO 2012003204 | A1 * | 1/2012 | ............ C08G 59/50 |

OTHER PUBLICATIONS

International Search Report in connection with International Patent Application No. PCT/EP2012/066311 mailed on Aug. 22, 2012.

* cited by examiner

*Primary Examiner* — Michael J Feely
(74) *Attorney, Agent, or Firm* — Steven C. Bauman

(57) ABSTRACT

The subject matter of the present application is a cold-curing two-component-epoxy adhesive, comprising
 (a) an epoxy-resin-component and
 (b) a curing agent-component, comprising a mercaptan curing agent,
in which the epoxy-resin-component comprises a color change indicator. Also described is a method for monitoring the curing progress of cold-curing two-component-epoxy adhesive via color change of the adhesive.

18 Claims, No Drawings

INDICATOR FOR CURE OF TWO-COMPONENT-EPOXY ADHESIVES

This is a continuation of PCT/EP2012/066311, filed Aug. 22, 2012, which claims priority to European Application No. 11425225.7, filed Aug. 24, 2011.

The present invention relates to a two-component adhesive based on a specific epoxy resin system. The epoxy resin system according to the present invention makes it possible to enable the user to monitor the curing progress of cold-curing two-component-epoxy adhesives by means of a color change during application.

Epoxy-based resin systems have been successfully used for some time as adhesives or repair compounds for consumers, hobbyists, and craftsmen, and in the aviation, automotive, or electrical industry, as adhesives or sealants or for the coating of surfaces, or as resin systems with a number of different materials for the manufacture of composite materials. Hardenable formulations that contain epoxy/hardener mixtures are suitable in particular as structural adhesives.

As cold-curing two-component-epoxy adhesives don't change their visual characteristics during polymerization, it is not easy to determine when they are cured enough to allow their usage. For example one can check the hardness of the adhesive in order to prove if the adhesive is fully cured, but the sensitivity of this test is poor.

WO 01/46290 A1 describes an ambient-temperature-stable, one-part curable epoxy adhesive-composition, which is thermally cured, comprising an epoxy resin, a latent curative system, comprising a first curative, in particular dicyandiamide, and an epoxy resin latent second curative, and a particulate thermoplastic polymeric material. Said latent second curative comprises a latent accelerator, which is a metal imidazolate compound. From the examples in WO 01/46290 A1 it can be seen, that at temperatures ≥100° C. the composition hardened and exhibited a slight color change, resulting from the reaction of the metal imidazolate with dicyandiamide. But cold-curing two-component-epoxy adhesive are not mentioned in this document.

An objective of this invention was therefore to develop a possibility to monitor the curing progress of cold-curing two-component-epoxy adhesives to be able to determine when they are cured enough to allow their usage.

This problem was solved by the subject of this invention, which is a cold-curing two-component-epoxy adhesive, comprising (a) an epoxy-resin-component and (b) a curing agent-component, comprising a mercaptan curing agent, in which the epoxy-resin-component comprises a color change indicator.

Cold-curing two-component-epoxy adhesives are known per se; they harden after mixing preferably at room temperature, for example in a temperature range from 15° C. to 25° C.

The adhesive according to the present invention enables the user to monitor the curing progress of cold-curing two-component-epoxy adhesives by means of a color change during application. So the user is able to determine when the adhesives are cured enough to allow their usage.

The change in color gives an easy way to recognize when the mixed material gets the final mechanical properties and the bonded piece can be put under mechanical stress, for example.

The change in color also indicates when the material has reached the maximum working time after which a reposition of the bonded piece is not longer possible.

Physical or mechanical properties of the final material are not affected.

The curing agent-component of the present invention comprises at least one color change indicator. The color change indicator is operable to at least partially change the color during the curing progress of the cold-curing two-component-epoxy adhesives.

In one preferred embodiment the color change indicator changes the epoxy adhesive from a first color to a second color during curing.

In another preferred embodiment the color change indicator changes the epoxy adhesive from colorless or white to colored.

In a further preferred embodiment, the color change indicator changes the epoxy adhesive from a first shade of a color to a different shade of the same color.

The color change of the epoxy adhesive during curing, according to embodiments of the present invention, depends on the identity of the color change indicator selected.

In a preferred embodiment, the color change indicator comprises an inorganic or organic dye, preferably including azo compounds or azo dyes, especially selected from Solvent Red 26 {1-[[2,5-dimethyl-4-[(2-methylphenyl)azo]-phenyl]azo]-2-naphthol}, Solvent Red 164 {1-[[4-[phenylazo]-phenyl]azo]-2-naphtholor} or combinations thereof. The use of such dyes, especially the use of Solvent Red 26 or Solvent Red 164, allows a clear identification of the end of the curing process as they show a change from a first color to a second color during curing, for example from RAL 4003 (Heather violet) for the freshly mixed product to RAL 4005 (Blue lilac). RAL is a standardized color matching system used in Europe and well know to the person skilled in the art.

The use of Solvent Red 26 or Solvent 164 Solvent Red 26 is very profitable, because their main use is as a standard fuel dye in the United States of America to distinguish heating oils from automotive diesel fuels. Thus, these dyes are used in large quantities and therefore are economically priced.

In another preferred embodiment, the color change indicator comprises a color change indicator, demonstrating a pH dependency, especially selected from methyl violet, eosin yellow, malachite green, thymol blue, methyl yellow, bromophenol blue, congo red, methyl orange, bromocresol green, methyl red, litmus, bromocresol purple, bromophenol red, bromothymol blue, phenol red, neutral red, naphtholphthalein, cresol red, phenolphthalein, thymolphthalein, alkali blue, Alizarin Yellow R, indigo carmine, or combinations thereof. A highly preferred color change indicator, demonstrating a pH dependency, is phenolphthalein. Phenolphthalein changes the color of the epoxy adhesive from colorless to colored, in particular fuchsia, and therefore unmistakable indicates the end of the curing process.

The inventors believe, that when the epoxy group reacts with the mercaptane, the acidity of the adhesive is reduced and a color change indicator, demonstrating a pH dependency, switches from a protonated to unprotonated structure. Then a color change results.

That effect of color change can be intensified by adding of tertiary amine, like N,N-dimethylbenzylamine for example. The most preferred tertiary amine according to this invention is tris(dimethylaminomethyl)phenol. It is also possible to use other amines, like secondary amines, diethylenetriamine for example. But tertiary amines, especially Tris(dimethylaminomethyl)phenol, perform strongly.

So, according to another preferred embodiment of the present invention the curing agent component (b) comprises Tris(dimethylaminomethyl)-phenol.

According to another preferred embodiment of the present invention the color change indicator is present in a range of 0.05 to 5.0 wt %, preferably 0.15 to 1.5 wt %, based on the total weight of the epoxy-resin-component (a).

The epoxy resin component of the present invention may include any common epoxy resin. Suitable epoxide resins for component (a) preferably include polyepoxides which have at least 2 1,2-epoxy groups per molecule. The epoxide equivalent of these polyepoxides can preferably vary between 150 and 4000. The polyepoxides can in principle be saturated, unsaturated, cyclic or acyclic, aliphatic, alicyclic, aromatic or heterocyclic polyepoxide compounds. Examples of suitable polyepoxides include the polyglycidyl ethers which are prepared by reacting epichlorohydrin or epibromohydrin with a polyphenol in the presence of alkali. Polyphenols suitable for this purpose include, for example, resorcinol, pyrocatechol, hydroquinone, bisphenol A (2,2-bis(4-hydroxyphenyl)propane), bisphenol F (bis(4-hydroxy-phenyl)methane), 1,1-bis(4-hydroxyphenyl)isobutane, 4,4'-dihydroxybenzophenone, 1,1-bis(4-hydroxyphenyl)-ethane, 1,5-hydroxynaphthalene. Likewise suitable are diglycidyl ethers of ethoxylated resorcinol (DGER), e.g., from Indspec Chemical Corporation.

Further polyepoxides suitable in principle are the polyglycidyl ethers of polyalcohols or diamines. These polyglycidyl ethers are derived from polyalcohols such as ethylene glycol, diethylene glycol, triethylene glycol, 1,2-propylene glycol, 1,4-butylene glycol, triethylene glycol, 1,5-pentanediol, 1,6-hexanediol or trimethylolpropane.

Further suitable polyepoxides are polyglycidyl esters of polycarboxylic acids, examples being reaction products of glycidol or epichlorohydrin with aliphatic or aromatic polycarboxylic acids such as oxalic acid, succinic acid, glutaric acid, terephthalic acid or dimer fatty acid.

Further suitable epoxies are derived from the epoxidation products of olefinically unsaturated cycloaliphatic compounds or from natural oils and fats.

Very particular preference is given to the epoxide resins which are derived by reaction of bisphenol A or bisphenol F and epichlorohydrin. In this case it can be advantageous to use mixtures of liquid and solid epoxide resins, the liquid epoxide resins preferably being based on bisphenol A and having a sufficiently low molecular weight. The epoxide resins which are liquid at room temperature generally have an epoxide equivalent weight of from 150 to about 220; particular preference is given to an epoxy equivalent weight range of from 182 to 192.

The epoxy resin component (a) may additionally comprise a further modified epoxide resin which gives the cured bond improved impact strength and low-temperature properties. Modified epoxide resins of this kind are known per se, and comprise reaction products of epoxide resins having an epoxy functionality greater than 1 with carboxyfunctional rubbers, dimer fatty acids or core/shell polymers whose cores have glass transition temperatures of below −30° C. The epoxide resin in this case is preferably employed in a stoichiometric excess and produces an epoxyfunctional reaction product. The excess of epoxide resin may be well beyond the stoichiometric excess. Epoxy functionality greater than 1 for the epoxide resin means in this case that the compounds contain more than 1, preferably at least 2, 1,2-epoxy groups per molecule. For these modified epoxide resins it is preferred to use polyepoxides with an epoxide equivalent of between 150 and 4000. In the same way as with the aforementioned carboxyfunctional modifiers, the modified epoxide resins which can be used can be obtained by reacting low-molecular weight epoxide resins having an epoxy functionality greater than 1 with amino-terminated polyethers, alkyl-, aryl- or alkylarylamines with a functionality of two or more, likewise in a stoichiometric excess.

Examples of modified resins of this kind are the adducts, known per se, of carboxyl-terminated butadiene-acrylonitrile copolymers (CTBN) and liquid epoxide resins based on the diglycidyl ether of bisphenol A. Additionally it is also possible to employ the reaction products of amino-terminated polyalkylene glycols (Jeffamines) with an excess of liquid polyepoxides. The last-mentioned reaction products are for example disclosed in WO 93/00381 A1. In principle it is also possible to use reaction products of mercaptofunctional prepolymers or liquid sulfur-containing polymers (such as those sold under the trademark THIOKOL) with an excess of polyepoxides as flexibilizing epoxide resins in accordance with the invention. Additionally suitable preferentially are the reaction products of polymeric fatty acids, particularly of dimer fatty acid, with epichlorohydrin, glycidol or, in particular, diglycidyl ether of bisphenol A (BADGE).

Further suitable modifiers for the modified epoxide resins include the core/shell polymers known from U.S. Pat. Nos. 5,290,857 and 5,686,509. In this case the core monomers ought to have a glass transition temperature of less than or equal to −30° C.; these monomers can be selected from the group of suitable diene monomers or suitable acrylate or methacrylate monomers; the core polymer may where appropriate contain crosslinking comonomer units in a small amount. The shell is constructed from a polymer having a glass transition temperature of at least +60° C. The shell polymer is preferably constructed from one or more lower alkyl acrylate or methacrylate monomer units (methyl and/or ethyl esters) and also polar monomers such as (meth)acrylonitrile, (meth)acrylamide, styrene and/or free-radically polymerizable unsaturated carboxylic acids or carboxylic anhydrides.

Further suitable modified epoxide resins for the epoxy resin components (a) of the invention are the products of reaction, disclosed in WO 01/94492 A1 pages 10 to 14, of polycarboxylic anhydrides with polyfunctional amino-terminated or hydroxyl-terminated polymers and their subsequent reaction with a large stoichiometric excess of epoxide resins.

In a similar way it is additionally possible to use, as modified epoxide resins, the products of reaction, disclosed in WO 00/20483 A2 on page 8 to 12, of a diamine or polyamine with a carboxylic anhydride and a polyphenol or aminophenol and also their reaction with a stoichiometric excess of a low molecular mass polyepoxide in accordance with the invention.

A further constituent of the epoxy resin component (a) may be reactive diluents. Reactive diluents for the purposes of this invention are low-viscosity substances containing epoxide groups (glycidyl ethers or glycidyl esters) with an aliphatic or aromatic structure. These reactive diluents can serve to lower the viscosity of the binder system above the softening point; they can be incorporated into the binder system in the course of curing. Typical examples of reactive diluents for use in accordance with the invention are mono-, di- or triglycidyl ethers of C6 to C14 monoalcohols or alkylphenols and also the monoglycidyl ethers of cashew nut shell oil, diglycidyl ethers of ethylene glycol, diethylene glycol, triethylene glycol, tetraethylene glycol, 1,2-propylene glycol, 1,4-butylene glycol, 1,5-pentanediol, 1,6-hexanediol and cyclohexanedimethanol, triglycidyl ethers of trimethylolpropane and also the glycidyl esters of C6 to C24 carboxylic acids or their mixtures.

According to the present invention the mercaptan curing agent is comprised as a hardener for epoxy resins. Preferably, it comprises at least two thiol groups per molecule. It is particularly preferred according to the present invention if the mercaptan curing agent is liquid at 22° C.

According to the present invention it may be preferred, in a specific embodiment, if the mercaptan curing agent is a polymeric compound.

Mercaptan curing agents preferred according to the present invention are the compounds known by the commercial designations:

Capcure 3-800, Capcure 3830-81, Capcure LOF, Capcure WR6, Capcure WR35, Capcure 40 SEC HV (Cognis),
GPM 800, GPM 800 LO, GPM 830 CB, GPM 845 MT, GPM 888, GPM 890 CB, GPM 891, GPM 895 FC (Gabriel Performance Products),
Karenz MT [pentaerythritol tetrakis(3-mercaptobutylate); CAS 31775-89-0] (Showa Denko),
dipentenedimercaptan (CAS 4802-20-4), Mercaptized Soy Oil, PM 407, PM 358, Mercaptized Castor Oil: 805-C (Chevron Phillips),
Thiocure® GDMA (glycol dimercaptoacetate; CAS 123-81-9), Thiocure® TMPMA (trimethylpropane trimercaptoacetate; CAS 10193-96-1), Thiocure® PETMA (pentaerythritol tetramercaptoacetate; CAS 10193-994), Thiocure® TMPMP (trimethylopropane tris-3-mercaptopropionate; CAS 33007-83-9), Thiocure® PETMP (pentaerythritol tetra-3-mercaptopropionate; CAS 7575-23-7), Thiocure® ETTMP (ethoxylated trimethylpropane tris-3-mercaptopropionate (polymer), CAS 345352-19-4) (Bruno Bock).

The following compounds are also mercaptan curing agents preferred according to the present invention:

DMDO (3,6-dioxa-1,8-octanedithiol),
hardenable DMDO reaction product,
3-oxa-1,5-pentanedithiol,
1,2-ethanedithiol T,
1,3-propanedithiol,
1,2-propanedithiol,
1,4-butanedithiol,
1,3-butanedithiol,
2,3-butanedithiol,
1,5-pentanedithiol,
1,3-pentanedithiol,
1,6-hexanedithiol,
1,3-dithio-3-methylbutane,
ethylcyclohexyldithiol (ECHDT),
methylcyclohexyldithiol,
methyl-substituted dimercaptodiethyl sulfide,
dimethyl-substituted dimercaptodiethyl sulfide,
2,3-dimercapto-1-propanol,
bis-(4-mercaptomethylphenyl) ether,
2,2'-thiodiethanethiol Mercaptan curing agents that are particularly preferred according to the present invention are:

Capcure 3-800, Capcure 3830-81, and Capcure LOF (Cognis),
GPM 800, GPM 800 LO, GPM 830 CB, and GPM 888 (Gabriel Performance Products),
Mercaptized Soy Oil, PM 407, PM 358, and Mercaptized Castor Oil 805-C (Chevron Phillips),
Thiocure® ETTMP (ethoxylated trimethylpropane tris-3-mercaptopropionate (polymer); CAS 345352-19-4) (Bruno Bock),
1,5-pentanedithiol,
1,3-pentanedithiol, and
1,6-hexanedithiol.

The mercaptan curing agents are used by preference at a ratio of 1 thiol equivalent mercaptan curing agent per 1 to 2 epoxy equivalent. This means that the utilization mixture preferably comprises an excess of reactive epoxy groups with respect to the reactive thiol groups.

According to another preferred embodiment of the present invention the mercaptan curing agent is present in a range of 5.0 to 95.0 wt %, preferably 25.0 to 75.0 wt %, based on the total weight of the curing agent-component (b).

It has furthermore proven to be advantageous, in an embodiment of the present invention, if the second component of the two-component composition according to the present invention contains, in addition to the mercaptan curing agent, an amine group-containing hardener for epoxy resins.

These amine group-containing hardeners for epoxy resins can be selected, for example, from the following compounds: tertiary amines, aromatic amines, and/or mixtures thereof. The hardeners can be incorporated stoichiometrically into the hardening reaction, but they can also be catalytically active.

Aminoethylpiperazine is also a suitable amine group-containing hardener for epoxy resins. This is a triamine containing primary, secondary, and tertiary amine groups. In a preferred embodiment of the invention, the curing agent-component (b) also comprises Aminoethylpiperazine.

Adducts of amino compounds with epoxy resins are furthermore suitable as accelerating additives. Suitable amino compounds are tertiary aliphatic, aromatic, or cyclic amines. Suitable epoxy compounds are, for example, polyepoxides based on glycidyl ethers of bisphenol A or F, or of resorcinol. Concrete examples of such adducts are adducts of tertiary amines such as 2-dimethylaminoethanol, N-substituted piperazines, N-substituted homopiperazines, N-substituted aminophenols with di- or polyglycidyl ethers of bisphenol A or F or of resorcinol.

Suitable for this, for example, are the di- or trifunctional aminoterminated polyalkylene glycols known as "Jeffamine® D" or "Jeffamine® T," especially based on ethylene oxide and/or propylene oxide. Further examples are polyamidoamides (preferably various grades of Versamid®, Aradur®, or Ancamide®), polyamines (preferably diethylenetriamine, triethylenetetramine, tetraethylenepentaamine, pentaethylenehexamine, Aradur®, Ancamin®, Lauromin®), cycloaliphatic polyamines (preferably Ancamine®, Lauromine®), polyaminoimidazoline (preferably Versamid®), aralkylamines (preferably MXDA), aromatic amines (preferably 4,4'-diaminodiphenyl sulfone, MDA), tertiary amines (preferably Versamine EH-30, Versamine EH-50).

The amino group-containing hardener or hardeners for epoxy resins are contained in the second component (b) according to the present invention by preference in quantities from 0 to 20 wt %, based on the second component (b) made up of hardeners and optionally further formulation constituents.

In a preferred embodiment, the tertiary amines in particular have proven to be particularly advantageous as they intensify the color change. They are preferably contained in the second component (b) according to the present invention by preference in a quantity from 0 to 20 wt %, preferably 0.1 to 15 wt %, in particular from 2 to 10 wt %, based on the total weight of the curing agent-component (b).

Compositions whose second component (b), which is the curing agent-component, contains or represents a hardener for epoxy resins that is effective in a temperature range from 0 to 60° C., in particular from 0 to 25° C., are particularly preferred according to the present invention.

As accelerators for the curing agent-component (b) it is possible to use guanidines, substituted guanidines, substituted ureas, melamine resins, guanamine derivatives, (cyclic) tertiary amines, aromatic amines and/or their mixtures. Examples of substituted guanidines are methylguanidine, dimethylguanidine, trimethylguanidine, tetramethylguanidine, methylisobiguanidine, dimethylisobiguanidine, tetramethylisobiguanidine, hexamethylisobiguanidine, heptamethylisobiguanidine and, especially, cyanoguanidine (dicyandiamide).

The concentration of the accelerator in the curing agent-component (b), if applied, may influence the hardening rate of the two-component adhesive of the invention within wide limits without adversely affecting the mechanical properties or the adhesion properties of the adhesive composition.

Typically the curing agent-component (b) may contain 0.1 to 10 wt %, referably between 1 and 5 wt %, of accelerator.

In another embodiment of the invention the two-component adhesive of the invention is totally free of guanidine.

In order to improve fracture behavior, in particular at temperatures below 0° C., the cold-curing two-component-epoxy adhesives according to the present invention can contain one or more different so-called toughness improvers or "tougheners." Such tougheners are known to those skilled in the art of epoxy adhesives. They can be selected, for example, from: thermoplastic isocyanates or polyurethanes, rubber particles, in particular those having a core-shell structure, and block copolymers, in particular those that contain a first polymer block having a glass transition temperature of less than 15° C. and a second polymer block having a glass transition temperature of more than 25° C. Such block copolymers are by preference selected from those in which a first polymer block is selected from a polybutadiene or polyisoprene block, and a second polymer block is selected from a polystyrene or polymethyl methacrylate block. Specific examples thereof are block copolymers having the following block structure: styrene-butadiene-(meth)acrylate, styrene-butadiene-(meth)acrylic acid esters, ethylene-(meth)acrylic acid ester-glycidyl (meth)acrylic acid ester, ethylene-(meth)acrylic acid ester-maleic acid anhydride, methyl methacrylate-butyl acrylate-methyl methacrylate.

It has furthermore proven advantageous according to the present invention if the first component (a) of the cold-curing two-component-epoxy adhesives according to the present invention contains, in addition at least one inorganic and/or organic filler.

In a further embodiment, it has proven advantageous if the second component (b) of the composition according to the present invention contains, in addition to the mercaptan curing agent which is essential to the invention, at least one inorganic and/or organic filler.

Fillers preferred according to the present invention are, for example, the various ground or precipitated chalks, carbon black, calcium-magnesium carbonates, talc, barite, and in particular silicate fillers of the aluminum-magnesium-calcium silicate type, for example wollastonite, chlorite. Especially preferred is quartz powder.

For weight reduction, the preparation can also contain, in addition to the aforesaid "normal" fillers, so-called lightweight fillers. These can be selected from the group of the hollow metal spheres such as, for example, hollow steel spheres, hollow glass spheres, fly ash (fillite), hollow plastic spheres based on phenol resins, epoxy resins, or polyesters, expanded hollow microspheres having a wall material made of (meth)acrylic acid ester copolymers, polystyrene, styrene/(meth)acrylate copolymers, and in particular of polyvinylidene chloride as well as copolymers of vinylidene chloride with acrylonitrile and/or (meth)acrylic acid esters, ceramic hollow spheres, or organic lightweight fillers of natural origin such as ground nut shells, for example the shells of cashew nuts, coconuts, or peanuts, as well as cork flour or coke powder. Particularly preferred in this context are those lightweight fillers, based on hollow microspheres, that ensure high compressive strength in the cured preparation.

In addition, the curable preparations according to the present invention can contain further usual adjuvants and additives such as, for example, plasticizers, rheology adjuvants, wetting agents, adhesion promoters, aging protection agents, stabilizers, and/or color pigments.

At the present time, the following preferred embodiment represents the best mode of the invention:

Epoxy-resin-component (a), comprising:
Polyepoxides, preferably Bisphenol F diglycidyl ether (BFDGE) or Bisphenol A diglycidyl ether (BADGE), in amounts of 50-80 wt %,
Fillers, like Quartz powder, in amounts of 20-50 wt %,
Color change indicator, preferably Solvent Red 164 or Solvent Red 26, in amounts of 0.05% to 5.0% wt %,
based on the total weight of the epoxy-resin-component (a).

Curing agent-component (b), comprising:
Mercaptan epoxy hardener in amounts of 40-80 wt %,
tertiary amine, preferably Tris(dimethylaminomethyl)phenol, in amounts of 0,1-20 wt %
Fillers, preferably Quartz powder and/or Titanium dioxide, in amounts of 20-50 wt %,
based on the total weight of the curing agent-component (b).

The two-component adhesives according to the present invention can be used as adhesives, or as a matrix for a composite, a further embodiment of the present invention being constituted thereby. The adhesive can be utilized in particular for joining and repairing parts in shipbuilding, aircraft construction, and vehicle construction. It is notable for good processability and high strength on the one hand, and particularly low health risk on the other. Further areas of application for the systems according to the present invention are the do-it-yourself sector, as well as the maintenance, repair, and overhaul sector for vehicles, machines, and aviation, but areas of application in other sectors of general industry are also encompassed according to the present invention.

The two-component adhesives according to the present invention are made up of two components. These must be stored separately from one another until immediately before utilization.

This can preferably be done by packaging in separate containers. Removal of the preparation can then be accomplished immediately before utilization. This can be accomplished by manually measuring out the requisite quantities from storage vessels, for example drums.

In addition to purely manual measuring, dispensing can also be accomplished using simple manual dispensing units or even fully automated systems. Such systems are marketed, for example, under the Loctite trademark. Examples of such automated systems are volumetric double gear pumps, double precision piston dispensers, double screw pump dispensers, or drum pump systems.

In a particularly preferred embodiment of the present invention, the preparations according to the present invention are offered in corresponding cartridges having a volume ratio of 1:1, 1:2, or 1:10 (component having epoxy resin mixture: component having mercaptan curing agent). The selection of such double cartridges is intended, according to the present invention, to ensure consistent dispensing and thus a constant mixing ratio between the two components. The cartridges according to the present invention can be emptied, upon utilization, with the aid of simple manual dispensing units, but also using pneumatic and/or completely automated systems.

A further subject of the present invention is therefore a dispensing system that comprises two separate containers which, separately from one another, contain the first and the second component of the compositions according to the present invention, as well as a dispensing apparatus.

In another packaging form, the two components of the composition according to the present invention can be coextruded and accordingly packaged so as to be present directly next to one another until utilization. The two components must then be thoroughly mixed with one another at the time of utilization. This can be accomplished, for example, by kneading the coextrudates.

A further subject of the present invention is a method for joining and/or repairing parts, in which method, in a first step, the two components of the compositions according to the present invention are mixed with one another, the resulting utilization mixture is applied onto the overlapping surfaces of the parts to be joined, the parts are then brought into contact with one another, and the utilization mixture then cures.

The curing time depends, in this context, on the exact composition of the system, the quantity applied, and the layer thickness, and can be between a few minutes and several days.

Another subject of the present invention is a method for monitoring the curing progress of cold-curing two-component-epoxy adhesive via color change of the adhesive, comprising the mixing of (a) an epoxy-resin-component and
(b) a curing agent-component, comprising mercaptan curing agent and preferably tertiary amine, in which the epoxy-resin-component comprises a color change indicator.

The curing progress can be monitored via color change after mixing the components (a) and (b).

EXAMPLES

Example (A)

Epoxy-resin-component (a):

| Bisphenol F diglycidyl ether | 65.0 g |
|---|---|
| Quartz powder | 34.0 g |
| Titanium dioxide | 0.5 g |
| Solvent Red 164 | 0.5 g |

Curing agent-component (b):

| Mercaptan epoxy hardener | 55.0 g |
|---|---|
| Aminoethylpiperazine | 5.0 g |
| Quartz powder | 32.0 g |
| Titanium dioxide | 3.0 g |
| Tris(dimethylaminomethyl)phenol | 5.0 g |

The two components have been mixed in usual manner. The color changed from RAL 4003 (Heather violet) for the freshly mixed product to RAL 4005 (Blue lilac) for the fully cured product. RAL is a standardized color matching system used in Europe and well know to the person skilled in the art.

Example (B)

Example (B) was in accordance with Example (A) with the difference that in Example (B) 0.5 g of phenolphthalein was used instead of 0.5 g of Solvent Red 164. The color changed from colorless for the freshly mixed product to fuchsia for the fully cured product.

What is claimed is:

1. Cold-curing two-component-epoxy adhesive, comprising
   (a) an epoxy-resin-component and
   (b) a curing agent-component, comprising a mercaptan curing agent present in a range of 5.0 to 95.0 wt. %, based on the total weight of the curing agent-component (b), yielding a ratio of 1 thiol equivalent of the mercaptan curing agent per 1 to 2 epoxy equivalents of the epoxy-resin-component (a),
in which the epoxy-resin-component comprises a color change indicator, wherein said cold-curing two-component-epoxy adhesive is capable of curing at a temperature as low as 0° C.

2. Adhesive according to claim 1, wherein the color change indicator is selected from the group consisting of an inorganic dye, an organic dye, azo compounds, azo dyes, Solvent Red 26 {1-[[2,5-dimethyl-4-[(2-methylphenyl)azo]-phenyl]azo]-2-naphthol}, Solvent Red 164 {1-[[4-[phenylazo]-phenyl]azo]-2-naphthol} and combinations thereof.

3. Adhesive according to claim 1, comprising a color change indicator that demonstrates a pH dependency.

4. Adhesive according to claim 1, comprising a color change indicator demonstrating a pH dependency, selected from the group consisting of methyl violet, eosin yellow, malachite green, thymol blue, methyl yellow, bromophenol blue, congo red, methyl orange, bromocresol green, methyl red, litmus, bromocresol purple, bromophenol red, bromothymol blue, phenol red, neutral red, naphtholphthalein, cresol red, phenolphthalein, thymolphthalein, alkali blue, Alizarin Yellow R, indigo carmine, and combinations thereof.

5. Adhesive according to claim 1, wherein the color change indicator is present in a range of 0.05 to 5.0 wt. %, based on the total weight of the epoxy-resin-component (a).

6. Adhesive according to claim 1, wherein the color change indicator is present in a range of 0.15 to 1.5 wt. %, based on the total weight of the epoxy-resin-component (a).

7. Adhesive according to claim 1, wherein the curing agent-component also comprises a tertiary amine, which is present in a quantity from 0 to 20 wt. %, based on the total weight of the curing agent-component (b).

8. Adhesive according to claim 7, wherein the tertiary amine is Tris(dimethylaminomethyl)phenol.

9. Adhesive according to claim 1, wherein the curing agent-component also comprises a tertiary amine, which is present in a quantity from 0.1 to 15 wt. %, based on the total weight of the curing agent-component (b).

10. Adhesive according to claim 1, wherein the curing agent-component also comprises a tertiary amine, which is present in a quantity from 2 to 10 wt. %, based on the total weight of the curing agent-component (b).

11. Adhesive according to claim 1, wherein the mercaptan curing agent is present in a range of 25.0 to 75.0 wt. %, based on the total weight of the curing agent-component (b).

12. Adhesive according to claim 1, wherein the mercaptan curing agent is selected from the group consisting of pentaerythritol tetrakis(3-mercaptobutylate); dipentenedimercaptan; Mercaptized Soy Oil; Mercaptized Castor Oil; glycol dimercaptoacetate; trimethylpropane trimercaptoacetate; pentaerythritol tetramercaptoacetate; trimethylopropane tris-3-mercaptopropionate; pentaerythritol tetra-3-mercaptopropionate; ethoxylated trimethylpropane tris-3-mercaptopropionate; 3,6-dioxa-1,8-octanedithiol; 3-oxa-1,5-pentanedithiol; 1,2-ethanedithiol T; 1,3-propanedithiol; 1,2-propanedithiol; 1,4-butanedithiol; 1,3-butanedithiol; 2,3-butanedithiol; 1,5-pentanedithiol; 1,3-pentanedithiol; 1,6-hexanedithiol; 1,3-dithio-3-methylbutane;

ethylcyclohexyldithiol; methylcyclohexyldithiol; methyl-substituted dimercaptodiethyl sulfide; dimethyl-substituted dimercaptodiethyl sulfide; 2,3-dimercapto-1-propanol; bis-(4-mercaptomethylphenyl) ether; and 2,2'-thiodiethanethiol.

13. Adhesive according to claim 1, further comprising an amine selected from the group consisting of aminoethylpiperazine, diethylenetriamine, triethylenetetramine, tetraethylenepentaamine, and pentaethylenehexamine.

14. Dispensing system, comprising two separate containers which, separately from one another, contain the components (a) and (b) of the adhesive according to claim 1, as well as a dispensing apparatus.

15. Method for monitoring the curing progress of cold-curing two-component-epoxy adhesive via color change of the adhesive, comprising the mixing of
   (a) an epoxy-resin-component and
   (b) a curing agent-component, comprising a mercaptan curing agent present in a range of 5.0 to 95.0 wt. %, based on the total weight of the curing agent-component (b), yielding a ratio of 1 thiol equivalent of the mercaptan curing agent per 1 to 2 epoxy equivalents of the epoxy-resin-component (a),
in which the epoxy-resin-component comprises a color change indicator, wherein said cold-curing two-component-epoxy adhesive is capable of curing at a temperature as low as 0° C.

16. Cold-curing two-component-epoxy adhesive, comprising
   (a) an epoxy-resin-component and
   (b) a curing agent-component, comprising a mercaptan curing agent,
in which the epoxy-resin-component comprises a color change indicator, wherein said cold-curing two-component-epoxy adhesive is capable of curing at a temperature as low as 0° C.; and wherein the color change indicator is selected from the group consisting of Solvent Red 26 {1-[[2,5-dimethyl-4-[(2-methylphenyl)azo]-phenyl]azo]-2-naphthol}, Solvent Red 164 {1-[[4-[phenylazo]-phenyl]azo]-2-naphthol} and combinations thereof.

17. Cold-curing two-component-epoxy adhesive comprising
   (a) an epoxy-resin-component, comprising:
      (i) at least one polyepoxide, in an amount between 50-80 wt. %,
      (ii) at least one filler, in an amount between of 20-50 wt. %,
      (iii) a color change indicator selected from the group consisting of Solvent Red 26 {1-[[2,5-dimethyl-4-[(2-methylphenyl)azo]-phenyl]azo]-2-naphthol}, Solvent Red 164 {1-[[4-[phenylazo]-phenyl]azo]-2-naphthol} and combinations thereof, in an amount between 0.05% to 5.0% wt. %, said amounts being based on the total weight of the epoxy-resin-component, and
   (b) a curing agent-component, comprising:
      (i) a mercaptan epoxy hardener in amounts of 40-80 wt. %,
      (ii) a tertiary amine, in amounts of 0.1-20 wt. %,
      (iii) at least one filler, in amounts of 20-50 wt. %, said amounts based on the total weight of the curing agent-component.

18. Cold-curing two-component-epoxy adhesive comprising
   (a) an epoxy-resin-component, comprising:
      (i) a polyepoxide selected from the group consisting of Bisphenol F diglycidyl ether (BFDGE) and Bisphenol A diglycidyl ether (BADGE), in an amount between 50-80 wt. %,
      (ii) quartz powder, in an amount between 20-50 wt. %,
      (iii) a color change indicator selected from the group consisting of Solvent Red 26 {1-[[2,5-dimethyl-4-[(2-methylphenyl)azo]-phenyl]azo]-2-naphthol}, Solvent Red 164 {1-[[4-[phenylazo]-phenyl]azo]-2-naphthol} and combinations thereof, in an amount between 0.05% to 5.0% wt. %, said amounts are based on the total weight of the epoxy-resin-component, and
   (b) curing agent-component, comprising:
      (i) a mercaptan epoxy hardener in an amount between 40-80wt. %,
      (ii) Tris(dimethylaminomethyl)phenol, in an amount between 0.1-20 wt. %,
      (iii) quartz powder, in an amount between of 20-50 wt. %, said amounts based on the total weight of the curing agent-component.

* * * * *